US012639089B2

(12) United States Patent
Kang

(10) Patent No.: US 12,639,089 B2
(45) Date of Patent: May 26, 2026

(54) METHOD AND SYSTEM FOR ELECTING MASTER NODE IN CLUSTER, AND MEDIUM

(71) Applicant: SHANDONG YINGXIN COMPUTER TECHNOLOGIES CO., LTD., Jinan (CN)

(72) Inventor: Kai Kang, Jinan (CN)

(73) Assignee: SHANDONG YINGXIN COMPUTER TECHNOLOGIES CO., LTD., Jinan (CN)

( * ) Notice: Subject to any disclaimer, the term of this patent is extended or adjusted under 35 U.S.C. 154(b) by 334 days.

(21) Appl. No.: 18/278,814

(22) PCT Filed: Apr. 28, 2022

(86) PCT No.: PCT/CN2022/089801
§ 371 (c)(1),
(2) Date: Aug. 24, 2023

(87) PCT Pub. No.: WO2022/237554
PCT Pub. Date: Nov. 17, 2022

(65) Prior Publication Data
US 2024/0134665 A1    Apr. 25, 2024
US 2024/0231863 A9    Jul. 11, 2024

(30) Foreign Application Priority Data

May 8, 2021    (CN) .......................... 202110501669.9

(51) Int. Cl.
*G06F 9/455* (2018.01)
(52) U.S. Cl.
CPC .................................... *G06F 9/455* (2013.01)
(58) Field of Classification Search
CPC ....................................................... G06F 9/455
See application file for complete search history.

(56) References Cited

FOREIGN PATENT DOCUMENTS

CN       107203617 A    9/2017
CN       108616566 A    10/2018
(Continued)

OTHER PUBLICATIONS

Elk. "Elasticsearch Cluster (Conceptual Perception)." https://www. liritian.com/archives/1055. Aug. 20, 2021.
(Continued)

*Primary Examiner* — Gregory A Kessler
(74) *Attorney, Agent, or Firm* — IPro, PLLC

(57) ABSTRACT

Disclosed in the present application a method for electing a master node in a cluster. The method comprises the following steps: on the basis of a hyper-converged cloud platform, creating a storage cluster, and configuring a status detection program and a full response operation function; performing active node screening on the storage cluster, so as to obtain an active node set and a candidate node set; setting a first data situation, detecting a second data situation of the active node set, and executing a determination step on the basis of the first data situation and the second data situation, so as to obtain a determination result; when the determination result is a first result, setting an arrangement sequence and a first selection position, and electing a first master node according to the arrangement sequence, the first selection position and the active node set; and when the determination result is a second result, configuring a consistency election algorithm and a distributed election algorithm, and electing a second master node on the basis of the candidate node set, the consistency election algorithm and the distributed election algorithm. By means of the present application, an excessively long election time of a master node and unsuccessful election of the master node are avoided, thereby improving the deployment efficiency of a cluster.

10 Claims, 3 Drawing Sheets

(56)　　　　　　References Cited

FOREIGN PATENT DOCUMENTS

| CN | 108810100 | A | 11/2018 |
|----|-----------|---|---------|
| CN | 109951331 | A | 6/2019  |
| CN | 113242296 | A | 8/2021  |

OTHER PUBLICATIONS

Take My Girl Out of the Bungalow. "Elasticsearch Cluster Principles." https:/ljuejin.cn/post/6900903209494134792. Nov. 30, 2020.
Zhiwu Wang. "Elasticsearch Important Knowledge Points I Detailed Explanation of Election Process." https://cloud.tenceni.com/developerlarticle/1705472. Sep. 25, 2020.
Al-Sayed, Mustafa M., Hesham A. Hassan, and Fatma A. Omara. "CloudFNF: An ontology structure for functional and non-functional features of cloud services." Journal of Parallel and Distributed Computing 141 (2020): 143-173.
Struggle Super Cloud. "Elasticsearch Learning Notes (4) Elasticsearch distribution." bbsmax. Dec. 30, 2017.

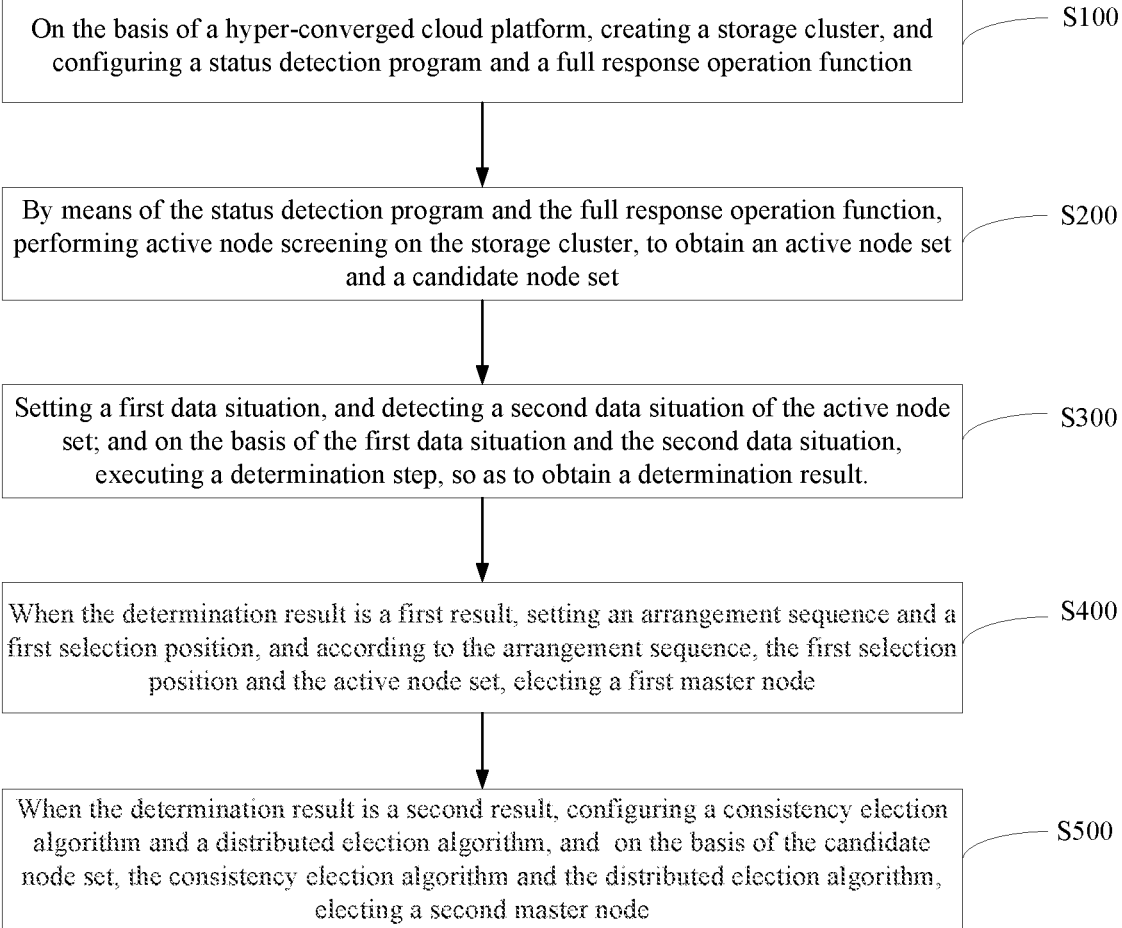

On the basis of a hyper-converged cloud platform, creating a storage cluster, and configuring a status detection program and a full response operation function — S100

By means of the status detection program and the full response operation function, performing active node screening on the storage cluster, to obtain an active node set and a candidate node set — S200

Setting a first data situation, and detecting a second data situation of the active node set; and on the basis of the first data situation and the second data situation, executing a determination step, so as to obtain a determination result. — S300

When the determination result is a first result, setting an arrangement sequence and a first selection position, and according to the arrangement sequence, the first selection position and the active node set, electing a first master node — S400

When the determination result is a second result, configuring a consistency election algorithm and a distributed election algorithm, and on the basis of the candidate node set, the consistency election algorithm and the distributed election algorithm, electing a second master node — S500

FIG. 1

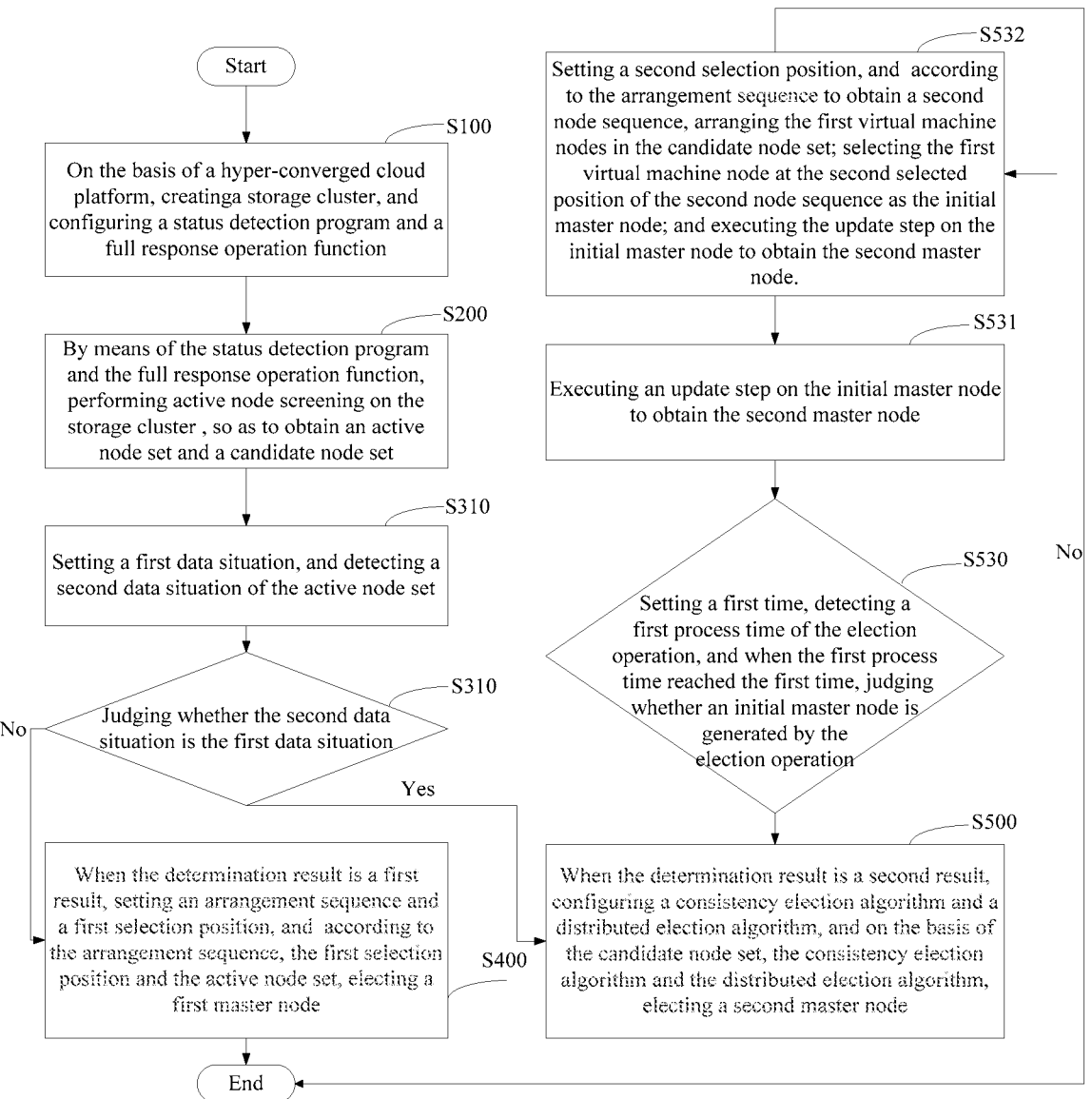

Start

On the basis of a hyper-converged cloud platform, creatinga storage cluster, and configuring a status detection program and a full response operation function ⎯ S100

By means of the status detection program and the full response operation function, performing active node screening on the storage cluster , so as to obtain an active node set and a candidate node set ⎯ S200

Setting a first data situation, and detecting a second data situation of the active node set ⎯ S310

Judging whether the second data situation is the first data situation ⎯ S310

No

Yes

When the determination result is a first result, setting an arrangement sequence and a first selection position, and according to the arrangement sequence, the first selection position and the active node set, electing a first master node

S400

End

Setting a second selection position, and according to the arrangement sequence to obtain a second node sequence, arranging the first virtual machine nodes in the candidate node set; selecting the first virtual machine node at the second selected position of the second node sequence as the initial master node; and executing the update step on the initial master node to obtain the second master node. ⎯ S532

Executing an update step on the initial master node to obtain the second master node ⎯ S531

Setting a first time, detecting a first process time of the election operation, and when the first process time reached the first time, judging whether an initial master node is generated by the election operation ⎯ S530

No

When the determination result is a second result, configuring a consistency election algorithm and a distributed election algorithm, and on the basis of the candidate node set, the consistency election algorithm and the distributed election algorithm, electing a second master node ⎯ S500

METHOD AND SYSTEM FOR ELECTING MASTER NODE IN CLUSTER, AND MEDIUM

This application claims priority to and benefits of Chinese Patent Application Serial No. 202110501669.9, and the title of "method for electing a master node of a cluster, a system and a medium" filed with the State Intellectual Property Office of P. R. China on May 8, 2021, the entire content of which is incorporated herein by reference.

FIELD

The present disclosure relates to the technical field of big data cluster deployment on the cloud and, more particularly, to a method for electing a master node of a cluster, a system and a medium.

BACKGROUND

Since the continuous development of cloud data storage technologies, cloud data clusters of hyper-converged architecture are widely applied. In the deployment process of the cloud data cluster of the hyper-converged architecture, the election of a master node in the cluster may affect the deployment efficiency of the entire cluster. In the conventional technology, the master node is elected based on Elasticsearch (search and analysis engine). When the master node is elected in this way, the election time may be prolonged and the election may not be completed under some circumstances, which greatly reduces the efficiency of cluster deployment.

SUMMARY

The present application mainly solves the problem in the conventional technology that, for the election of a master node, the election time may be prolonged and the election may not be completed, and the cluster deployment efficiency is greatly reduced.

In order to solve the above-mentioned technical problem, a technical solution adopted by the present application is to provide a method for electing a master node of a cluster, the method includes the following steps:

initialization:

on the basis of a hyper-converged cloud platform, creating a storage cluster, and configuring a status detection program and a full response operation function;

by means of the status detection program and the full response operation function, performing active node screening on the storage cluster, to obtain an active node set and a candidate node set;

determining a node situation:

setting a first data situation, and detecting a second data situation of the active node set; and on the basis of the first data situation and the second data situation, executing the step of determining the node situation, to obtain a determination result;

electing the master node:

when the determination result is a first result, setting an arrangement sequence and a first selection position, and according to the arrangement sequence, the first selection position and the active node set, electing a first master node; and when the determination result is a second result, configuring a consistency election algorithm and a distribution election algorithm, and on the basis of the candidate node set, the consistency election algorithm and the distribution election algorithm, electing a second master node.

As an improved solution, the step of, by means of the status detection program and the full response operation function, performing active node screening on the storage cluster, to obtain an active node set and a candidate node set further includes:

setting a first status, and by means of the status detection program, detecting a second status of virtual machine nodes in the storage cluster, under the condition the second status does not match the first status, marking a virtual machine node corresponding to the second status;

setting a first return value, by means of the full response operation function, sending a response signal to an unmarked virtual machine node in the storage cluster, and acquiring a second return value for the response signal, and setting a virtual machine node corresponding to the second return value matching the first return value as a first virtual machine node;

setting first configuration item data, acquiring second configuration item data of the first virtual machine node, and on the basis of the first configuration item data and the second configuration item data set, acquiring the active node set and the candidate node set.

As an improved solution, the step of, on the basis of the first configuration item data and the second configuration item data set, acquiring the active node set and the candidate node set further includes:

creating a first container and a second container;

adding the first virtual machine node corresponding to the second configuration item data matching the first configuration item data, to the first container, to obtain the active node set;

adding the first virtual machine node corresponding to the second configuration item data that do not match the first configuration item data, to the second container, to obtain the candidate node set.

As an improved solution, the determination step includes:

setting the first data situation as that the active node set is an empty set, and setting the second data condition as that the existing node situation of the active node set;

determining whether the existing node situation is that the active node set is an empty set; in response to no, generating the first result; and in response to yes, generating the second result.

As an improved solution, the step of, according to the arrangement sequence, the first selection position and the active node set, electing a first master node further includes:

according to the arrangement sequence, arranging the first virtual machine nodes in the active node set, to obtain a first node sequence;

selecting the first virtual machine node in the first selected position of the first node sequence as the first master node.

As an improved solution, the step of, on the basis of the candidate node set, the consistency election algorithm and the distribution election algorithm, electing a second master node includes:

acquiring a version datum, and selecting the consistency election algorithm or the distribution election algorithm that matches the version information as a first election algorithm;

invoking the first election algorithm to perform an election operation on the first virtual machine node in the candidate node set;

setting a first time, detecting a first process time of the election operation, and determining whether an initial master node is generated by the election operation when the first process time reaches the first time; and under the condition the initial master node is generated, executing an update step on the initial master node to obtain the second master node;

under the condition the initial master node is not generated, setting a second selection position, and according to the arrangement sequence, arranging the first virtual machine nodes in the candidate node set, to obtain a second node sequence; selecting the first virtual machine node at the second selected position of the second node sequence as the initial master node; and executing the update step on the initial master node to obtain the second master node.

As an improved solution, the update step includes:

setting a second time and a percentage threshold, by means of the initial master node, sending a join request to the virtual machine node in the storage cluster, and timing it to generate a second process time;

when the second process time reaches the second time, acquiring a feedback signal corresponding to the join request;

counting the signal number of the feedback signals, acquiring the node number of the virtual machine node in the storage cluster, and calculating a first ratio of the node number to the signal number;

when the first ratio is not less than the percentage threshold, setting the initial master node as the master node to be updated;

acquiring a value of the first time of the backup data corresponding to the master node to be updated, and acquiring a value of the second time of existing data in the master node to be updated;

comparing whether the value of the second time is less than the value of the first time;

under the condition that the value of the second time is less than the value of the first time, replacing the node data with the backup data, and setting the master node to be updated after replacing the node data as the second master node;

when the value of the second time is not less than the value of the first time, setting the master node to be updated as the second master node.

As an improved solution, the method further includes:

after obtaining the candidate node set, confirming a metadata storage disk of the first virtual machine node in the candidate node set;

creating a backup disk, configuring a backup program, and detecting whether new data exist, and under the condition of yes, invoking the backup program to transmit the data in the metadata storage disk to the backup disk;

importing the new data into the metadata storage disk, and setting the new data as the backup data of the first virtual machine node.

The present application further provides a system for electing a master node of a cluster, the system includes an initialization module, a node set creation module, a determination module, a first master node generation module and a second master node generation module, wherein, the initialization module is configured to create a storage cluster according to a hyper-converged cloud platform, and configure a status detection program and a full response operation function;

the node set creation module is configured to perform active node screening on the storage cluster by invoking the status detection program and the full response operation function, to obtain an active node set and a candidate node set;

the determination module is configured to set a first data situation and detect a second data situation of the active node set, and detect a second data situation of the active node set, and by the determination module, executing the step of determining the node situation according to the first data situation and the second data situation, to obtain a determination result;

when the determination result is a first result, the first master node generation module is configured to set an arrangement sequence and a first selection position, and according to the arrangement sequence, the first selection position and the active node set, electing a first master node;

when the determination result is a second result, the second master node generation module is configured to configure a consistency election algorithm and a distribution election algorithm, and on the basis of the candidate node set, the consistency election algorithm and the distribution election algorithm, electing a second master node.

The present application further provides a non-transitory computer-readable storage medium, in which a computer program is stored, when the computer program is executed by a processor, the method for electing a master node in a cluster is realized.

The advantageous effects of the present application lie in:

1. According to the method for electing a master node of a cluster, the election of the active node is capable to be optimized to a certain extent by means of the status detection program and the full response operation function, the metadata have an incremental back up by means of the backup program, and the master node is forcibly elected by means of the newly designed master node election process, so that the deficiencies of long master mode election time and unsuccessful master mode election in the conventional technology are avoided, and the deployment efficiency of the big data cluster is greatly improved.

2. According to the system for electing a master node of a cluster, by means of the mutual cooperation of the initialization module, the node set creation module, the determination module, the first master node generation module and the second master node generation module, the election of the active node is capable to be optimized to a certain extent by means of the status detection program and the full response operation function, the metadata have an incremental back up by means of the backup program, and the master node is forcibly elected by means of the newly designed master node election process, so that the deficiencies that the master node election time may be prolonged and the master node election is unsuccessful in the conventional technology are avoided, and the deployment efficiency of the big data cluster is greatly improved.

3. According to the non-transitory computer-readable storage medium stated in the present application, mutual cooperation of the initialization module, the node set creation module, the determination module, the first master node generation module and the second master node generation module is able to be realized, and so that the election of the active node is optimized to a certain extent by means of the status detection program and the full response operation function, the metadata have an incremental back up by means of the backup program, and the master node is forcibly elected by means of the newly designed master node election process. The deficiencies that the election time of a master node may be prolonged and the master node election is unsuccessful in the conventional technology is avoided, the deployment efficiency of the big data cluster is greatly improved, and the operability of the method for electing a master node in the cluster is effectively improved.

BRIEF DESCRIPTION OF THE DRAWINGS

In order to illustrate the embodiments of the present application or the technical solutions in the prior art more clearly, the drawings that are needed in the description of the embodiments or the prior art will be briefly introduced below. Apparently, the drawings in the following description are some embodiments of the present application, and other drawings may be obtained according to these drawings without creative work for a person skilled in the art.

FIG. 1 is a flowchart of the method for electing the master node of the cluster according to an embodiment of the present application;

FIG. 2 is a schematic diagram of flowchart of the method for electing the master node of the cluster according to an embodiment of the present application;

DETAILED DESCRIPTION

Figure 3:
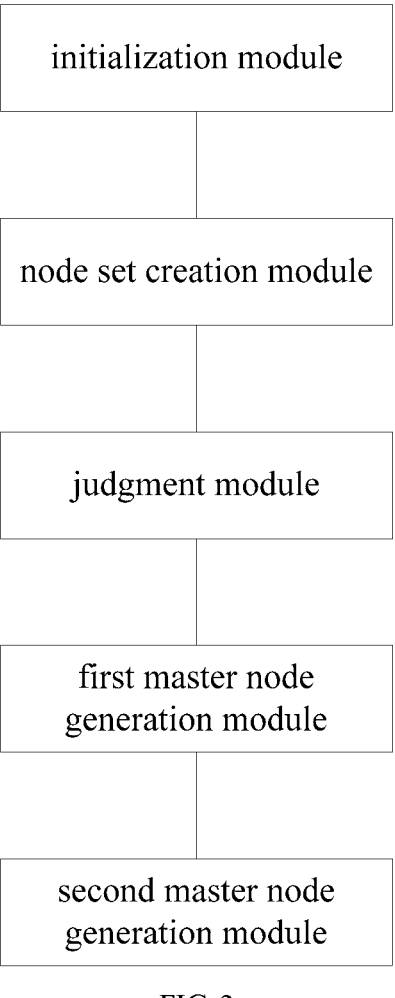
FIG. 3 is an architecture diagram of the system for electing the master node of the cluster according to an embodiment of the present application.

The embodiments of the present application will be described in detail below with reference to the drawings, so that the advantages and features of the present application is able to be more easily understood by a person skilled in the art, and the protection scope of the present application is able to be defined more clearly.

In the description of the present application, it should be noted that, the described embodiments are some embodiments of the present application, rather than all of the present embodiments. Based on the present embodiments in the present application, all other embodiments obtained by a person skilled in the art without creative labor belong to the protection scope of the present application.

In the description of the present application, it should be noted that, the terms "first" and "second" are merely for the purpose of describing, and should not be construed as indicating or implying relative importance.

In the description of the present application, it should be noted that, unless otherwise specified and limited, the terms "hyper-converged cloud platform", "storage cluster", "status detection program", "full response operation function", "active node screening", "active node set", "candidate node set", "data situation", "determination step", "arrangement sequence", "selection position", "virtual machine node", "response signal", "configuration item Data", "container", "node sequence", "version information", "election algorithm", "process time", "initial master node", "update step", "percentage threshold", "join request", "master node to be updated", "backup data", "backup disk", "backup program", "metadata storage disk", "initialization module", "node set creation module", "determination module", "first master node generation module", "second master node generation module" etc. should be interpreted broadly. For a person skilled in the art, the specific meanings of the above terms in the present application may be understood according to specific situations.

In the description of the present application, it should be noted that:

Raft is a consistency election algorithm;

Bully is a distribution election algorithm;

Cbt is a data storage technology;

SDS is a category of a virtual machine;

Vmtools is an operating program for a virtual machine;

fullPingRepones is a full response operation, which is a detection technology;

ES, namely Elasticsearch, is a processing solution based on a search engine;

FPGA (Field Programmable Gate Array) is a field programmable logic gate array.

A method for electing a master node of a cluster is provided in the present embodiment, as shown in FIG. 1 and FIG. 2, the method includes the following steps:

First of all, it should be noted that, the method for electing the master node of the cluster described in the present embodiment is applied to the deployment process of a data storage cluster on the cloud under the hyper-converged architecture. In the conventional technology, the process of deploying the data storage cluster on the cloud is bidirectionally optimized from a data layer and a hardware layer. On the one hand, installing and configuring data on the data layer, and on the other hand, by a FPGA accelerator card, optimizing the performance of a cloud platform on the hardware layer. Wherein, in the process of deploying the data layer, the election process of the master node is involved. Currently, the Elasticsearch algorithm is used for electing a master node in a cluster, and the commonly used ES versions are ES6.3.2 and ES7.3.2, and the two versions perform coordination optimization by a Bully algorithm and a Raft algorithm respectively. When a master node is elected by these two methods, the phenomenon that the election time is too long will occur. On the one hand, the reason is that the elected master node is continuously faked death or continuously recovered; and on the other hand, the reason is that when the cluster scale is too large, candidate nodes will compete repeatedly, which will lead to the election being interrupted circularly. In conclusion, in the existing methods, to a certain extent, the election efficiency of the master node is low or even the election of the master node may not be completed, and the deployment efficiency of the cluster will be further affected. In addition, considering that in an existing method, a way of hardware acceleration optimization is adopted, the natural advantages of a storage pool and data interoperability of a cloud data cluster under the hyper-converged architecture are not taken. According to the present method, the natural advantages of the hyper-converged architecture and a new master node election mechanism are integrated to solve the above-mentioned problems.

S100, on the basis of a hyper-converged cloud platform, creating a storage cluster, and configuring a status detection program and a full response operation function;

The step S100 includes:

S110, acquiring a server category of a hyper-converged all-in-one machine of a hyper-converged cloud platform, and setting management nodes and compute nodes based on the category; configuring local storage pools in the management nodes and the compute nodes respectively; existing data disks of all nodes are stored in the local storage pool; and data received by the node except metadata are stored in the existing data disk.

S120, establishing a SDS virtual machine at a host end of the management node and the compute node, and setting the SDS virtual machine as a virtual machine node; setting a separate storage specification for the metadata, establishing corresponding es metadata storage pools in the management node and the compute node respectively based on the storage specification, and storing metadata disks of all the nodes in the es metadata storage pool; storing all the metadata received by the node in the metadata disk.

S130, establishing a data storage pool on the cloud platform, and by means of the data storage pool, storing the local storage pool and the metadata storage pool; wherein the metadata storage pool, the local storage pool and the data storage pool are independent of each other; integrating the data storage pool, the metadata storage pool and the local storage pool to obtain the storage cluster.

S140, configuring the status detection program for all the storage clusters on the cloud platform. In the present embodiment, the status detection program is configured in a vmtools tool which is capable to detect status of the virtual machine in the storage cluster, and by invoking this tool to access an interface of the storage cluster and change the status of the storage cluster; and configuring the full response operation function. In the present embodiment, the full response operation function is a fullPingRepones function, and by means of this function, it is capable of performing a response test on the virtual machine in the storage cluster.

By means of this step, a data foundation is provided for subsequent active node optimization and data incremental optimization.

S200, by means of the status detection program and the full response operation function, performing active node screening on the storage cluster, to obtain an active node set and a candidate node set.

The step S200 includes:

S210, setting a first status, and by means of the status detection program, detecting a second status of virtual machine nodes in the storage cluster, in response to the second status does not match the first status, marking a virtual machine node corresponding to the second status. In the present embodiment, the first status may be a general status of the virtual machine obtained by an engineer according to experiences, and the second status is the detected current status of the virtual machine. The key point of this step is that, when the virtual machine is operated by means of the full response operation function, firstly, a portion of the virtual machines that may be abnormal are eliminated, and so that identification progress of the entire active nodes is sped up. Therefore, in this step, in response to the second status does not match the first status, marking the virtual machine corresponding to the second status directly.

S220, setting a first return value, by means of the full response operation function, sending a response signal to an unmarked virtual machine node in the storage cluster, and acquiring a second return value for the response signal, and setting a virtual machine node corresponding to the second return value matching the first return value as a first virtual machine node. Following the concept of the previous step, performing the response test on the unmarked virtual machine after preliminary screening. In the present embodiment, the mark is merely used as a way of distinguishing, and should not be understood as a necessary technical feature. Since the full response function will send a response signal to all the unmarked virtual machines, thus acquiring their return values thereafter. To further screen the second return value, setting the first return value as a comparison benchmark of the second return value. In the present embodiment, generally, the first return value is set as true, and in response to the second return value matching the first return value, that is, the second return value is also true, setting the virtual machine node corresponding to the second return value as the first virtual machine node.

S230, setting first configuration item data, acquiring second configuration item data of the first virtual machine node; creating a first container and a second container; adding the first virtual machine node corresponding to the second configuration item data matching the first configuration item data to the first container, to obtain the active node set; adding the first virtual machine node corresponding to the second configuration item data that do not match the first configuration item data to the second container, to obtain the candidate node set. In the present embodiment, configuration items are ignore_non_master_pings and node_master, and the corresponding first configuration item data are initial values respectively corresponding to these two configuration items. After performing the detection, adding the first virtual machine nodes matching or not matching the initial values to the corresponding containers respectively, that is, integrating the first virtual machine nodes matching or not matching the initial values. In the present embodiment, the active node set are an active list active master and a candidate list master candidate.

S240, After generating the candidate node set, acquiring a metadata storage disk of the first virtual machine node in the candidate node set; creating a backup disk, configuring a backup program, and detecting whether new data exist, and in response to yes, invoking the backup program to transmit the data in the metadata storage disk to the backup disk; and importing the new data into the metadata storage disk, and setting the new data as the backup data of the first virtual machine node. In the present embodiment, to keep the data of the node as the latest data, and keep the performance under the best status at the same time, the backup program, namely a Cbt program, is configured. And after acquiring the candidate list masterCandidate, invoking the Cbt program to determine whether new data is written in, and in response to the new data is written in, extracting current data in the metadata disk of the virtual machine in the candidate list masterCandidate and placing into the new backup disk, and the new data are written into the metadata disk. And this step is continuously performed, so that the data in the metadata disk are kept as the latest data, and the performance of the data storage pool is not affected at the same time.

S300, determining data situation: setting a first data situation, and detecting a second data situation of the active node set; and on the basis of the first data situation and the second data situation, executing the step of determining the node situation, to obtain a determination result.

The step S300 includes:

S310, since the specific master node election needs to be performed by means of specific number of nodes in the node set, so that setting the first data condition, and detecting the second data condition of the active node set.

S320, determining whether the second data situation is the first data situation.

S330, when the second node situation is not the first data situation, generating a first result; under the condition the second data situation is the first data situation, generating a second result. In the present embodiment, the first data situation is a comparison benchmark for the number of the first virtual machine nodes in the active node set, which is set as an empty set herein, that is, the number of the first virtual machine nodes is zero. And the same as the concept above-mentioned, the second data situation is the current data situation of the active node set, that is, the number of the first virtual machine nodes currently detected in the active node set. Therefore, when the second data situation is a non-empty set, that is, the number of the first virtual machine nodes currently detected is not zero, generating the first result, and correspondingly, when the second data situation is an empty set, that is, the number of first virtual machine nodes currently detected is zero, generating the second result. Wherein, the first result and the second result are merely used for distinguishing and marking, and should not be understood as necessary technical features.

S400, when the determination result is a first result, setting an arrangement sequence and a first selection position, and according to the arrangement sequence, the first selection position and the active node set, electing a first master node.

The step S400 includes:

S410, according to the arrangement sequence, arranging the first virtual machine nodes in the active node set, to obtain a first node sequence.

S420, selecting the first virtual machine node in the first selected position of the first node sequence as the first master node. In the present embodiment, the arrangement sequence is that sequencing from large to small according to a number identifier generated after entering the active list, and a corresponding first selection position is a tail end of the sequence, and the purpose is to set the virtual machine node with the minimum sequence value as the first main node.

By means of this step, for the case that the active node set is not empty, the corresponding master node is quickly elected.

S500, when the determination result is a second result, configuring a consistency election algorithm and a distribution election algorithm, and on the basis of the candidate node set, the consistency election algorithm and the distribution election algorithm, electing a second master node.

The step S500 includes:

S510, acquiring a version datum, and selecting the consistency election algorithm or the distribution election algorithm that matches the version datum as a first election algorithm. In this step, since the active node set is empty, merely the candidate node set is capable to be selected for performing related operations, correspondingly, the selected first election algorithm should be consistent with open source version datum of the cluster. In the present embodiment, the distribution election algorithm is a bully algorithm, and the consistency election algorithm is a raft algorithm. The bully algorithm is selected as the first election algorithm when the open source version datum is es6 or its predecessors, and the raft algorithm is selected as the first election algorithm when the open source version datum is es7.

S520, invoking the first election algorithm to perform an election operation on the first virtual machine node in the candidate node set. Correspondingly, the election operation performed by this algorithm may generate a master node with a large probability. And under a special circumstance, the election of the master node may fail. However, in the method described in the present embodiment, the next step of operation is performed to avoid the above situation and the situation that the generation time of the master node is longer.

S530, setting a first time, detecting a first process time of the election operation, and in case that the first process time reaches the first time, determining whether an initial master node is generated by the election operation. In the present embodiment, the first time is set to 30 s, and the first time is not limited herein, it may be set according to actual situations.

S531, in response to the initial master node is generated, executing an update step on the initial master node to obtain the second master node, and no longer entering the procedure of re-election.

S532, in response to the initial master node is not generated, the master node needs to be elected forcibly to save the election time of the master node and improve the election efficiency of the master node: setting a second selection position, and according to the arrangement sequence, arranging the first virtual machine nodes in the candidate node set, to obtain a second node sequence; selecting the first virtual machine node at the second selected position of the second node sequence as the initial master node; and executing the update step on the initial master node to obtain the second master node. In the present embodiment, the master node is forcibly elected by using a sequence maximum value algorithm, so that the second selection position is set as a top end of the sequence, that is, the virtual machine node corresponding to a sequence maximum value, the same as the previous sequence step, in response to a first bit and a second bit are the same, a selection position may be set to be two bits, which is not limited herein.

S540, correspondingly, to keep the data of the master node up to date and check the stability of the status of the master node, executing an update step, and the update step includes:

S541, setting a second time and a percentage threshold, by means of the initial master node, sending a join request to the virtual machine node in the storage cluster, and timing it to generate a second process time. Wherein, in the present embodiment, the second time is set to be 60 s, and the percentage threshold is set to be ⅓, which is not limited herein. After sending the join request of clusterState, the node will automatically reply to the join request, that is, a signal is fed back.

S542, in case that the second process time reaches the second time, acquiring a feedback signal corresponding to the join request.

S543, counting the signal number of the feedback signals, acquiring the node number of the virtual machine node in the storage cluster, and calculating a first ratio of the node number to the signal number.

S544, in response to the first ratio is not less than the percentage threshold, setting the initial master node as the master node to be updated. In the present embodiment, it means that in response to the feedback signal is sent by more than ⅓ or ⅓ of the nodes, confirming the master node to be updated as a master node. Correspondingly, in the present embodiment, there is a limitation on the number of feedback times within 60 s, and in response to the node fails to send the feedback signal, it has merely three times of opportunities to be re-sent, to save time and improve efficiency, and this number is not limited herein, but merely as a way of implementation.

S545, acquiring a value of the first time of the backup data corresponding to the master node to be updated, and acquiring a value of the second time of existing data in the master node to be updated. In this step, the CBT technology in step S200 is used, the corresponding value of the first time and value of the second time are used for distinguishing the update degree of the data, and the smaller one is the one with poor update degree, that is, the one with older data.

S546, comparing whether the value of the second time is less than the value of the first time. In response to the value of the second time is less than the value of the first time, replacing the node data with the backup data, and setting the master node to be updated after replacing the node data as the second master node; in response to the value of the second time is not less than the value of the first time, setting the master node to be updated as the second master node. Following the concept of the previous step, this step also keeps the data in the master node up to date while the performance is ensured.

S600, after generating the second master node, the election of the master node is finished, and setting an election end timestamp and a risk parameter; detecting whether the second master node fails, in response to the second master node fails, recording whole failure time of the second master node, and comparing whether a difference between the failure time and the election end timestamp is greater than the risk parameter, in response to yes, setting the second master node as a risk node, and recording and outputting relevant data of the risk node. In this step, in order to ensure the stability of the elected master node again, a further risk check is carried out, the final purpose is to set the master node as the minimum value in the candidate list in response to this master node is a risk node, that is, the master node does not participate in the next election, and notifying a user by means of information or an email prompts for early warn. Correspondingly, it will be returned to step S532, continuing to elect the master node forcibly.

Correspondingly, the method described in the present embodiment is not merely adopted to the hyper-converged cloud platform, but also adopted to a common platform and other clusters using a fullPingRespons method.

According to the method described in the present embodiment, the deficiencies that the election time of electing a master node may be prolonged, the election may not be successful, and the master node is faked death after the election is successful in the conventional technology may be avoided. And the metadata is kept under the latest data status by adopting the cbt technology without occupying the performance status of the storage cluster. Correspondingly, in view of the circumstance that the node election fails, a solution of forced election is adopted, so that the high efficiency and stability of the node election are further ensured, and the deficiencies in the conventional technology are overcome.

According to the present embodiment, a system for electing a master node of a cluster is provided, as shown in FIG. 3, the system includes: an initialization module, a node set creation module, a determination module, a first master node generation module and a second master node generation module.

According to the system for electing the master node of the cluster, the initialization module is configured to create a storage cluster according to a hypes-converged cloud platform, and configure a status detection program and a full response operation function.

By the initialization module, acquiring a server category of a hyper-converged all-in-one machine in a hyper-converged cloud platform, and setting a management node and a compute node based on the category; and by the initialization module, configuring local storage pools in the management node and the compute node respectively. Wherein, existing data disks of all nodes are stored in the local storage pool, and data received by the node except metadata are stored in the existing data disk.

By the initialization module, establishing a SDS virtual machine at a host end of the management node and the compute node, and setting the SDS virtual machine as a virtual machine node; by the initialization module, setting a separate storage specification for the metadata, and establishing corresponding es metadata storage pools in the management nodes and the compute nodes respectively based on the storage specification. Wherein, storing metadata disks of all the nodes in the es metadata storage pool; storing all the metadata received by the node in the metadata disk.

By the initialization module, establishing a data storage pool on the cloud platform, and by means of the data storage pool, storing a local storage pool and the metadata storage pool. Wherein, the metadata storage pool, the local storage pool and the data storage pool are independent of each other. And by the initialization module, integrating the data storage pool, the metadata storage pool and the local storage pool to obtain a storage cluster.

By the initialization module, configuring the status detection program and the full response operation function for all storage clusters on the cloud platform.

According to the system for electing the master node of the cluster, the node creation module is configured to perform active node screening on the storage cluster by invoking the status detection program and the full response operation function, to obtain an active node set and a candidate node set.

By the node set creation module, setting a first status, and by means of the status detection program, detecting a second status of virtual machine nodes in the storage cluster, in response to the second status does not match the first status, by the node set creation module, marking a virtual machine node corresponding to the second status.

By the node set creation module, setting a first return value, by means of the full response operation function, sending a response signal to an unmarked virtual machine node in the storage cluster, and by the node set creation module, acquiring a second return value for the response signal, and setting a virtual machine node corresponding to the second return value matching the first return value as a first virtual machine node.

By the node set creation module, setting first configuration item data, acquiring second configuration item data of the first virtual machine node; by the node set creation module, creating a first container and a second container, adding the first virtual machine node corresponding to the second configuration item data matching the first configuration item data to the first container, to obtain the active node set; and by the node set creation module, adding the first virtual machine node corresponding to the second configuration item data that do not match the first configuration item data to the second container, to obtain the candidate node set.

By the node set creation module, after generating the candidate node set, acquiring a metadata storage disk of the first virtual machine node in the candidate node set; by the node set creation module, creating a backup disk, configuring a backup program, and detecting whether new data exist, and under the condition of yes, by the node set creation module, invoking the backup program to transmit the data in the metadata storage disk to the backup disk, and importing the new data into the metadata storage disk, and setting the new data as the backup data of the first virtual machine node.

According to the system for electing the master node of the cluster, the determination module is configured to set a first data situation and detect a second data situation of the active node set, and by the determination module, executing the step of determining according to the first data situation and the second data situation, to obtain a determination result;

When the second data situation is not the first data situation, by the determination module, generating a first result; and when the second data situation is the first data situation, by the determination module, generating a second result.

According to the system for electing the master node of the cluster, the first master node generation module is configured to set an arrangement sequence and a first selection position when the determination result is a first result, and electing a first master node according to the arrangement sequence, the first selection position and the active node set.

By the first master node generation module, arranging the first virtual machine nodes in the active node set according to the arrangement sequence, to obtain a first node sequence. By the first master node generation module, selecting the first virtual machine node in the first selected position of the first node sequence as the first master node.

According to the system for electing the master node of the cluster, the second master node generation module is configured to, configure a consistency election algorithm and a distribution election algorithm under the condition that the determination result is a second result, and by the second master node generation module, electing a second master node on the basis of the candidate node set, the consistency election algorithm and the distribution election algorithm.

By the second master node generation module, acquiring a version datum, and selecting the consistency election algorithm or the distribution election algorithm that matches the version datum as a first election algorithm.

By the second master node generation module, invoking the first election algorithm to perform an election operation on the first virtual machine node in the candidate node set.

By the second master node generation module, setting a first time, and detecting a first process time of the election operation, and by the second master node generation module, in case that the first process time reaches the first time, determining whether an initial master node is generated by the election operation.

In response to the initial master node is generated, by the second master node generation module, executing an update step on the initial master node, to obtain the second master node, and no longer entering the procedure for re-election.

In response to the initial master node is not generated, the second master node generation module needs to forcibly elect the master node, to save the master node selection time and improve the master node election efficiency: by the second master node generation module, setting a second selection position, and arranging the first virtual machine nodes in the candidate node set according to the arrangement sequence, to obtain a second node sequence; and by the second master node generation module, selecting the first virtual machine node at the second selected position of the second node sequence as the initial master node; and by the second master node generation module, executing the update step on the initial master node to obtain the second master node.

The update step includes: by the second master node generation module, setting a second time and a percentage threshold, and by means of the initial master node, sending a join request to the virtual machine node in the storage cluster, and timing it to generate a second process time.

By the second master node generation module, in case that the second process time reaches the second time, acquiring a feedback signal corresponding to the join request. And by the second master node generation module, counting the signal number of the feedback signals, acquiring the node number of the virtual machine node in the storage cluster, and calculating a first ratio of the node number to the signal number. Under the condition the first ratio is not less than the percentage threshold, by the second master node generation module, setting the initial master node as the master node to be updated.

By the second master node generation module, acquiring a value of the first time of the backup data corresponding to the master node to be updated, and acquiring a value of the second time of existing data in the master node to be updated.

By the second master node generation module, comparing whether the value of the second time is less than the value of the first time. In response to the value of the second time is less than the value of the first time, by the second master node generation module, replacing the node data with the backup data, and setting the master node to be updated after replacing the node data as the second master node; in response to the value of the second time is not less than the value of the first time, by the second master node generation module, setting the master node to be updated as the second master node.

After generating the second master node, the election of the master node is finished, and by the second master node generation module, setting an election end timestamp and a risk parameter; and by the second master node generation module, detecting whether the second master node fails. In response to the second master node fails, by the second master node generation module, recording the whole failure time of the second master node, and comparing whether a difference between the failure time and the election end timestamp is greater than the risk parameter, in response to yes, by the second master node generation module, setting the second master node as a risk node, and recording and outputting relevant data of the risk node. In response to this master node is a risk node, by the second master node generation module, setting this master node as the minimum value in the candidate list, that is, the master node does not participate in the next election, and notifying a user by means of information or an email prompts for early warn.

Correspondingly, the system described in the present embodiment is not merely adopted to the hyper-converged cloud platform, but also adopted to a common platform and other clusters that use fullPingRespons.

According to the system for electing the master node of the cluster of the present embodiment, by means of the mutual cooperation of every module, the deficiencies that the election time of electing a master node is too long, the election may not be successful, and the master node is faked death after the election is successful in the prior art may be avoided. And the metadata is kept the latest data status by adopting the cbt technology without occupying the performance status of the storage cluster. Correspondingly, for the failure of the node election, a solution of forced election is adopted, so that the high efficiency and stability of node election are further ensured, and the defects in the prior art are overcome.

According to the present embodiment, a non-transitory computer-readable storage medium is provided, the non-transitory computer-readable storage medium:

the non-transitory storage medium is configured for storing computer software instructions for implementing the method for electing a master node of a cluster above-mentioned, and the computer software instruction includes the program for executing the method for electing the master node of the cluster. The program may be embedded in the system for electing a master node of a cluster described in embodiment 2, so that the system for electing the master node of the cluster may implement the method for electing the master node of the cluster above-mentioned by executing the embedded program.

In addition, the non-transitory computer-readable storage medium in the present embodiment may adopt any combination of one or more readable storage media, wherein the readable storage media include an electric, an optical, an electromagnetic, an infrared or a semiconductor system, a device or a component, or any combination of the above-mentioned.

Different from the conventional technology, the method for electing the master node of the cluster, the system and the medium according to the present application may optimize the election of the active node to a certain extent by means of the status detection program and the full response operation function in the method, by the backup program, performing incremental backup on the metadata, and the master node is forcibly elected by the newly designed master node election process, thus effective technical support is provided for the method. The phenomenon that the master node election time is too long and the master node election is unsuccessful in the prior art is avoided, and the deployment efficiency of a big data cluster is greatly improved.

The above serial numbers of the present embodiments disclosed in the present embodiments of the present application are merely for description, and do not represent the advantages and disadvantages of the present embodiments.

A person skilled in the art may understand that all or some of the steps of implementing the above-mentioned embodiments may be completed by hardware, or the related hardware may be instructed by a program. The program may be stored in a non-transitory computer-readable storage medium, and the above-mentioned storage medium may be a read-merely memory, a magnetic disk or an optical disk and the like.

The above-mentioned are merely embodiments of the present application, and it does not limit the patent scope of the present application. Any equivalent structure or equivalent process transformation made by using the contents of specification and drawings of the present application, or directly or indirectly applied to other related technical fields, are equally included in the patent protection scope of the present application.

The invention claimed is:

1. A method for electing a master node of a cluster, comprising the following steps:

by using a hyper-converged cloud platform, creating a storage cluster, and configuring a status detection program and a full response operation function;

by means of the status detection program and the full response operation function, performing active node screening on the storage cluster, to obtain an active node set and a candidate node set;

setting a first data situation, and detecting a second data situation of the active node set; and on the basis of the first data situation and the second data situation, executing a step of determining a node situation, to obtain a determination result;

when the determination result is a first result, setting an arrangement sequence and a first selection position, and according to the arrangement sequence, the first selection position and the active node set, electing a first master node; and when the determination result is a second result, configuring a consistency election algorithm and a distribution election algorithm, and on the basis of the candidate node set, the consistency election algorithm and the distribution election algorithm, electing a second master node;

wherein the step of, by means of the status detection program and the full response operation function, performing active node screening on the storage cluster, to obtain an active node set and a candidate node set further comprises:

setting a first status, and by means of the status detection program, detecting a second status of virtual machine nodes in the storage cluster, in response to the second status does not match the first status, marking a virtual machine node corresponding to the second status;

setting a first return value, by means of the full response operation function, sending a response signal to an unmarked virtual machine node in the storage cluster, and acquiring a second return value for the response signal, and setting a virtual machine node corresponding to the second return value matching the first return value as a first virtual machine node;

setting first configuration item data, acquiring second configuration item data of the first virtual machine node, and on the basis of the first configuration item data and the second configuration item data set, acquiring the active node set and the candidate node set;

wherein the step of, on the basis of the first configuration item data and the second configuration item data set, acquiring the active node set and the candidate node set further comprises:

creating a first container and a second container;

adding the first virtual machine node corresponding to the second configuration item data matching the first configuration item data to the first container, to obtain the active node set;

adding the first virtual machine node corresponding to the second configuration item data that do not match the first configuration item data to the second container, to obtain the candidate node set; and wherein in the step of, on the basis of the first data situation and the second data situation, executing the step of determining the node situation, to obtain the determination result, the determining the node situation step comprises:

setting the first data situation as that the active node set is an empty set, and setting the second data condition as that the existing node situation of the active node set;

determining whether the existing node situation is that the active node set is an empty set; in response to no, generating the first result; and in response to yes, generating the second result;

wherein the step of, according to the arrangement sequence, the first selection position and the active node set, electing a first master node further comprises:

according to the arrangement sequence, arranging the first virtual machine nodes in the active node set, to obtain a first node sequence;

selecting the first virtual machine node in the first selected position of the first node sequence as the first master node; and wherein the step of, on the basis of the candidate node set, the consistency election algorithm and the distribution election algorithm, electing a second master node further comprises:

acquiring a version datum, and selecting the consistency election algorithm or the distribution election algorithm that matches the version data as a first election algorithm;

invoking the first election algorithm to perform an election operation on the first virtual machine node in the candidate node set;

setting a first time, detecting a first process time of the election operation, and determining whether an initial master node is generated by the election operation when the first process time reaches the first time; and in response to the initial master node is generated, executing an update step on the initial master node to obtain the second master node;

in response to the initial master node is not generated, setting a second selection position, and according to the arrangement sequence, arranging the first virtual machine nodes in the candidate node set, to obtain a second node sequence; selecting the first virtual machine node at the second selected position of the second node sequence as the initial master node; and executing the update step on the initial master node to obtain the second master node.

2. The method for electing the master node of the cluster of claim 1, wherein the step of in response to the initial master node is generated, executing an update step on the initial master node to obtain the second master node comprises:

setting a second time and a percentage threshold, by means of the initial master node, sending a join request to the virtual machine node in the storage cluster, and timing it to generate a second process time;

when the second process time reaches the second time, acquiring a feedback signal corresponding to the join request;

counting the signal number of the feedback signals, acquiring the node number of the virtual machine node in the storage cluster, and calculating a first ratio of the node number to the signal number;

when the first ratio is not less than the percentage threshold, setting the initial master node as the master node to be updated;

acquiring a value of the first time of the backup data corresponding to the master node to be updated, and acquiring a value of the second time of existing data in the master node to be updated;

comparing whether the value of the second time is less than the value of the first time;

when the value of the second time is less than the value of the first time, replacing the node data with the backup data, and setting the master node to be updated after replacing the node data as the second master node;

in response to the value of the second time is not less than the value of the first time, setting the master node to be updated as the second master node.

3. The method for electing the master node of the cluster of claim 2, wherein the method further comprises:

after obtaining the candidate node set, confirming a metadata storage disk of the first virtual machine node in the candidate node set;

creating a backup disk, configuring a backup program, and detecting whether new data exist, and in response to yes, invoking the backup program to transmit the data in the metadata storage disk to the backup disk;

importing the new data into the metadata storage disk, and setting the new data as the backup data of the first virtual machine node.

4. The method for electing the master node of the cluster of claim 1, wherein the step of, by using a hyper-converged cloud platform, creating a storage cluster, and configuring a status detection program and a full response operation function further comprises:

acquiring a server category of a hyper-converged all-in-one machine of a hyper-converged cloud platform, and setting management nodes and compute nodes based on the category; configuring local storage pools in the management nodes and the compute nodes respectively; existing data disks of all nodes are stored in the local storage pool; and data received by the node except metadata are stored in the existing data disk;

establishing a SDS virtual machine at a host end of the management node and the compute node, and setting the SDS virtual machine as a virtual machine node; setting a separate storage specification for the metadata, establishing corresponding es metadata storage pools in the management node and the compute node respectively based on the storage specification, and storing metadata disks of all the nodes in the es metadata storage pool; storing all the metadata received by the node in the metadata disk;

establishing a data storage pool on the cloud platform, and by means of the data storage pool, storing the local storage pool and the metadata storage pool; wherein the metadata storage pool, the local storage pool and the data storage pool are independent of each other; integrating the data storage pool, the metadata storage pool and the local storage pool to obtain the storage cluster;

configuring the status detection program and the full response operation function for all the storage clusters on the cloud platform.

5. The method for electing the master node of the cluster of claim 1, wherein the first result and the second result are distinguishing identifiers of corresponding determination results.

6. A non-transitory computer-readable storage medium, in which a computer program is stored, wherein when the computer program is executed by a processor, the method for electing the master node of the cluster according to claim 1 is realized.

7. A computer device, comprising:

at least one processor; and a memory, wherein the memory stores computer instructions that are capable of being executed on the processor, and when the instruction is executed by the processor, the steps of the method according to claim 1 are implemented.

8. The computer device of claim 7, wherein in the step of in response to the initial master node is generated, executing an update step on the initial master node to obtain the second master node, the update step comprises:

setting a second time and a percentage threshold, by means of the initial master node, sending a join request to the virtual machine node in the storage cluster, and timing it to generate a second process time;

when the second process time reaches the second time, acquiring a feedback signal corresponding to the join request;

counting the signal number of the feedback signals, acquiring the node number of the virtual machine node in the storage cluster, and calculating a first ratio of the node number to the signal number;

in response to the first ratio is not less than the percentage threshold, setting the initial master node as the master node to be updated;

acquiring a value of the first time of the backup data corresponding to the master node to be updated, and acquiring a value of the second time of existing data in the master node to be updated;

comparing whether the value of the second time is less than the value of the first time;

in response to the value of the second time is less than the value of the first time, replacing the node data with the backup data, and setting the master node to be updated after replacing the node data as the second master node;

in response to the value of the second time is not less than the value of the first time, setting the master node to be updated as the second master node.

9. The computer device of claim 8, wherein the method further comprises:

after obtaining the candidate node set, confirming a metadata storage disk of the first virtual machine node in the candidate node set;

creating a backup disk, configuring a backup program, and detecting whether new data exist, and in response to yes, invoking the backup program to transmit the data in the metadata storage disk to the backup disk;

importing the new data into the metadata storage disk, and setting the new data as the backup data of the first virtual machine node.

10. The computer device of claim 7, wherein the step of, by using a hyper-converged cloud platform, creating a storage cluster, and configuring a status detection program and a full response operation function further comprises:

acquiring a server category of a hyper-converged all-in-one machine of a hyper-converged cloud platform, and setting management nodes and compute nodes based on the category; configuring local storage pools in the management nodes and the compute nodes respectively; existing data disks of all nodes are stored in the local storage pool; and data received by the node except metadata are stored in the existing data disk;

establishing a SDS virtual machine at a host end of the management node and the compute node, and setting the SDS virtual machine as a virtual machine node; setting a separate storage specification for the metadata, establishing corresponding es metadata storage pools in the management node and the compute node respectively based on the storage specification, and storing metadata disks of all the nodes in the es metadata storage pool; storing all the metadata received by the node in the metadata disk;

establishing a data storage pool on the cloud platform, and by means of the data storage pool, storing the local storage pool and the metadata storage pool; wherein the metadata storage pool, the local storage pool and the data storage pool are independent of each other; integrating the data storage pool, the metadata storage pool and the local storage pool to obtain the storage cluster;

configuring the status detection program and the full response operation function for all the storage clusters on the cloud platform.

\* \* \* \* \*